United States Patent [19]

Lagna

[11] Patent Number: 4,667,100

[45] Date of Patent: May 19, 1987

[54] METHODS AND APPARATUS FOR MASS SPECTROMETRIC ANALYSIS OF FLUIDS

[76] Inventor: William M. Lagna, 11209 Sandyvale Rd., Bradshaw, Md. 21021

[21] Appl. No.: 724,166

[22] Filed: Apr. 17, 1985

[51] Int. Cl.[4] .............................................. B01D 59/44

[52] U.S. Cl. .................................... 250/282; 250/281; 250/288

[58] Field of Search ........... 250/281, 282, 288, 423 R, 250/424

[56] References Cited

U.S. PATENT DOCUMENTS

| | | | |
|---|---|---|---|
| 4,144,451 | 3/1979 | Kambara | 250/281 |
| 4,209,696 | 6/1980 | Fite | 250/281 |
| 4,300,044 | 11/1981 | Iribarne | 250/282 |
| 4,531,056 | 7/1985 | Labowsky et al. | 250/281 |

*Primary Examiner*—Bruce C. Anderson

*Attorney, Agent, or Firm*—Schwartz, Jeffery, Schwaab, Mack, Blumenthal & Evans

[57] ABSTRACT

In accordance with the invention, an electrode is held at high voltage potential within a chamber constructed of high dielectric material. A sample is sprayed past the electrode and at least a portion of the sample is ionized. Some of the ions are directed through a suitable inlet into the high vacuum portion of the mass to charge analyzer.

42 Claims, 5 Drawing Figures

METHODS AND APPARATUS FOR MASS SPECTROMETRIC ANALYSIS OF FLUIDS

BACKGROUND OF THE INVENTION

The invention relates to a method and apparatus for mass spectrometric analysis of gases and liquids and constituents thereof such as may be received from a gas or liquid chromatograph.

Major limitations exist in current mass spectrometric ionization techniques in the methods used to volatilize the analytes. Electron impact, photoionization, ion-molecule charge transfer, and thermal ionization are a number of methods by which the ionization can be accomplished. However, heat is used almost universally to effect volatilization. Many large molecules and biologically important compounds can not be determined using mass spectrometry due to their thermally sensitive nature. Heat induced decomposition and fragmentation of these unstable compounds occurs prior to detection by the mass analyzer.

Electron impact, chemical ionization, thermospray, and direct liquid introduction require the input of thermal energy to accomplish or maintain the volatility of the analyte. Atmospheric pressure ionization also uses heat to assist in the volatilization of liquid samples. The plasma desorption techniques, laser desorption, fast atom bombardment, and californium-252 desorption are at least partially dependent on thermal energy to accomplish volatilization and ionization of the analyte. Both fast atom bombardment and californium-252 are further restricted because no method currently exists to interface them directly with any chromatographic separation techniques. Ion evaporation, a non-thermal ion separation method, and thermospray require either that the analytes exist in ionized form in aqueous solvent or that the analytes can be protonated through ion-molecule proton transfer reactions from an aqueous buffered solvent for detection by the mass analyzer. Gases and compounds which are insoluble or uncharged in aqueous solvents are not analyzed by these methods. This restriction limits the application of these techniques, particularly in the analysis of many thermally unstable compounds.

However, a thermally independent volatilization process, known as Rayleigh ion emission, provides a means to effect non-thermal volatilization of charged species from liquids. When the electric field at the surface of a droplet is of sufficient energy that the surface potential can be overcome, emission of charged species occurs from the droplet. This ion emission reduces the electrostatic repulsion experienced by an ion at the surface of the droplet. For ion emission to occur, the field at the surface of the droplet must exceed the Rayleigh instability number.

The conditions for Rayleigh instability are described in the following equation:

$$\alpha = q^2/3U\tau\epsilon$$

Instability occurs when $\alpha=4$ where q is the charge on a drop, V is the volume, $\tau$ is the surface tension and $\epsilon$ is the dielectric constant. The critical radii for ion emission from water or other solvents or mixtures by Raleigh instability can, therefore, be calculated directly.

A droplet undergoing Rayleigh ion emission will lose a considerable fraction of the charge with only a small change in the radius. If the solvent is sufficiently volatile, evaporation will occur until the critical charge to radius ratio is exceeded, and Rayleigh emission will occur again. This happens because evaporation proceeds with virtually no loss of electrolyte. Aqueous electrolytic solvation energies are typically of the range 3–6 eV, and the probability of an ion escaping from the surface is calculated to be in the order of $10^{-50}$. If the droplet is in the micron size range, a competing process of ion evaporation can take place. In ion evaporation, ion clusters can be emitted from a charged droplet experiencing a large electric field applied at the surface. For these small droplets, the net charge on the droplet combined with its small radius is sufficient to produce an electric field at the surface of enough energy to allow ions to evaporate.

By passing gases through a very high potential electric field, non-thermal ionization can be accomplished by conduction and induction. If the field potential is greater than $10^5$ volts per meter, ionization of the gases and constituents of the gases occurs primarily by induction and independent of ion-molecule charge transfer reactions.

Ion emission by Rayleigh instability occurs in thermospray, atmospheric pressure ionization, ion evaporation and electrospray liquid chromatographic/mass spectrometric interfaces. However, all of these methods rely on the existence of preformed ions, or require additional electrolytes or buffers within the solvent from which a proton can be transferred to effect ionization of the analytes. Low dielectric, non-aqueous and aprotic solvents do not support ion formation, and as a result, few compounds exist in ionized form in these solvents. Thermospray, atmospheric pressure ionization, ion evaporation and electrospray are therefore primarily limited to aqueous solvent systems. Also, because of dependence on ion-molecule reactions to accomplish charge transfer, these methods, particularly atmospheric pressure ionization, ion evaporation and electrospray are limited to operational pressures near ambient. At reduced pressures, fewer ion-molecule collisions result in fewer charge transfer reactions. At increased pressures, evaporation of droplets is reduced. Droplet evaporation is necessary in these methods to accomplish ion emission by decreasing the droplet volume until the critical Rayleigh charge to radius limit is exceeded.

The use of an induction electrode in atmospheric pressure ionization and ion evaporation serves to increase the net charge on a droplet. In ion evaporation, the induction electrode is positioned adjacent to the liquid spray orifice. This type of system is disclosed in U.S. Pat. No. 4,300,044 to Iribarne et al. The charge on the electrode is opposite to the droplet charge at a potential of 1.5 to 3 kilovolts. This serves to increase the relative field strength experienced by ions at the surface of the droplet, to assist the ion emission process. The field generated is of insufficient strength to ionize either the solute or the solvent. Therefore, only polar solvents containing preformed ions can be used with this method.

The induction electrode in atmospheric pressure ionization liquid chromatography/mass spectrometry is positioned within the path of the sprayed droplets. This type of system is disclosed in U.S. Pat. No. 4,144,451 to Kambara. The electrode is of the same polarity as the ions to be analyzed, at an electric potential of typically 1.5 to 3.0 kilovolts. The electrode serves to increase the net charge on a droplet, primarily by conduction. However, the electromagnetic field generated by the induction electrode is of insufficient strength to ionize non-polar, organic and aprotic solvents or compounds. Water, or another polar or ionic compound is usually added to non-polar solvents to increase the relative amount of charge transfer in order to accomplish ionization. As such, non-polar solvents are observed as protonated molecular ions or ion clusters in positive ion mode.

In electrospray and related processes, electric potential is applied to the capillary which carries the liquid effluent. This type of system is disclosed in U.S. Pat. No. 4,209,696 to Fite. Charge transfer occurs by conduction through the solvent. High dielectric and non-polar solvents are not conductive by nature, and as a result, little charge is transfered to these solvent types. These solvents have not been used successfully with this method. The strength of an electromagnetic applied field is inversely proportional to the size of the field radiator. The field radiator in electrospray is the liquid chromatograph capillary, which is a large diameter conductor. Because of the large size of the field radiator, and the charge loss by conduction through the solvent, the liquid effluent at the droplet shearing point is subject to a reduced electric field. The field generated is of insufficient strength to ionize non-polar or aprotic solvents, even with applied voltages over 30 kilovolts.

SUMMARY OF THE INVENTION

The present invention is a non-thermal ionization process and apparatus used to interface a gas or liquid chromatograph to a mass spectrometer. The process of the invention overcomes several of the limitations inherent in existing ionization methods, particularly when used with liquid chromatography/mass spectrometry interfaces. The effluent from a gas or liquid chromatograph is introduced into an electrically insulated ion source volume as a mist from a gas/liquid nebulizer. A strong electric field is induced within the source volume using a stainless steel electrode to which a very high voltage is applied. Ions are formed within the vapors and droplets by conduction and induction. Ions migrate to the surface of the droplets to minimize electrostatic repulsion, and the ions are emitted into the surrounding gases when the critical Rayleigh charge to radius ratio is exceeded. The ions are directed in a weak electric field from the source volume into the mass spectrometer through a small sampling orifice. Mass separation and detection are accomplished by conventional means. Either positive or negative ions can be generated, dependent upon the potential applied to the induction electrode. Aqueous and organic solvents, as well as mixtures can be used, with or without electrolytes or buffers. Charge transfer is not dependent on ion-molecule proton transfer reactions. Operational pressures can therefore be varied over a wide range.

The large charge is imparted through a droplet and the surrounding gas on passing through a very high electric potential field. In this alternate application of Rayleigh ion emission, the charge is formed by conduction and induction throughout the volume of the gases and droplets while subject to the high electric potential field. It is necessary that sufficient charge is transferred to the droplets to accomplish Rayleigh emission. It has been shown for aqueous solvents, a surface field potential of approximately $10^9$ volts per meter is necessary to effect ion emission. At liquid flow rates of 0.5 to 4.0 ml per minute, field strengths in excess of $10^9$ volts per meter can be radiated from a needle electrode held at potentials of 15 to above 120 kilovolts. Typical total ion currents are in the range of hundreds of microamps for ionization of the liquid effluent. Most gas effluents require total ion currents in the microamp range.

DETAILED DESCRIPTION OF PREFERRED EMBODIMENTS

Figure 1:
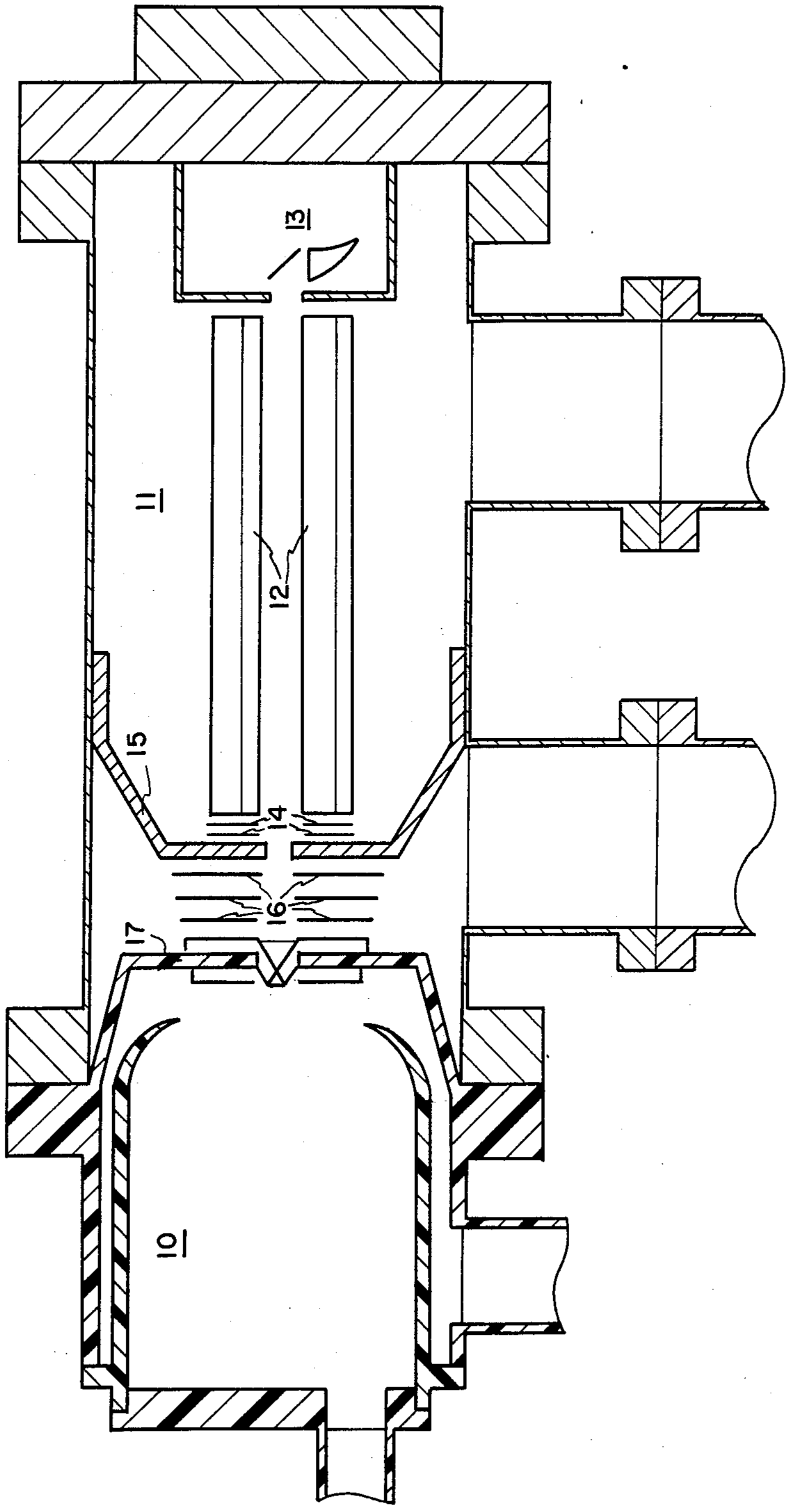
FIG. 1 is a schematic of a differentially pumped quadrupole mass analyzer suitable for interface with the described ion generation source.

A quadrupole mass analyzer is shown in cross-section in FIG. 1 and includes the ion source volume region 10. Housed within a cylindrical vacuum chamber 11 is the quadrupole mass filter 12 and detector assembly, composed of a conversion dynode and electron multiplier 13 which are connected to the appropriate data system for display, print out and archival storage of the data output from the mass analysis. Directly in front of the mass filter 12 is a series of ion lenses 14, which serve to focus ions received through an orifice ($2.0\times10^{-3}$ meters diameter) mounted in the separating flange 15. Positioned in front of the separating flange 15 is a series of ion lenses 16 which serve to focus ions received from the ion source volume region 10 through an orifice ($35\times10^{-6}$ meters diameter) mounted in the front flange 17. The ion lense region and mass filter regions are connected to turbomolecular vacuum pumps (not shown) which serve to reduce the pressure within the vacuum chamber so that ion transport and mass analysis can be accomplished. The construction and operation of the mass filter is conventional, and the principles of operation are familiar to anyone skilled in the field. Although a quadrupole mass analyzer is pictured, the ion source may be interfaced to other types of mass analyzers. Methods to accomplish such interfaces include direct inlet, differentially pumped inlets, or any other ion transport technique familiar to those skilled in the field.

Figure 2:
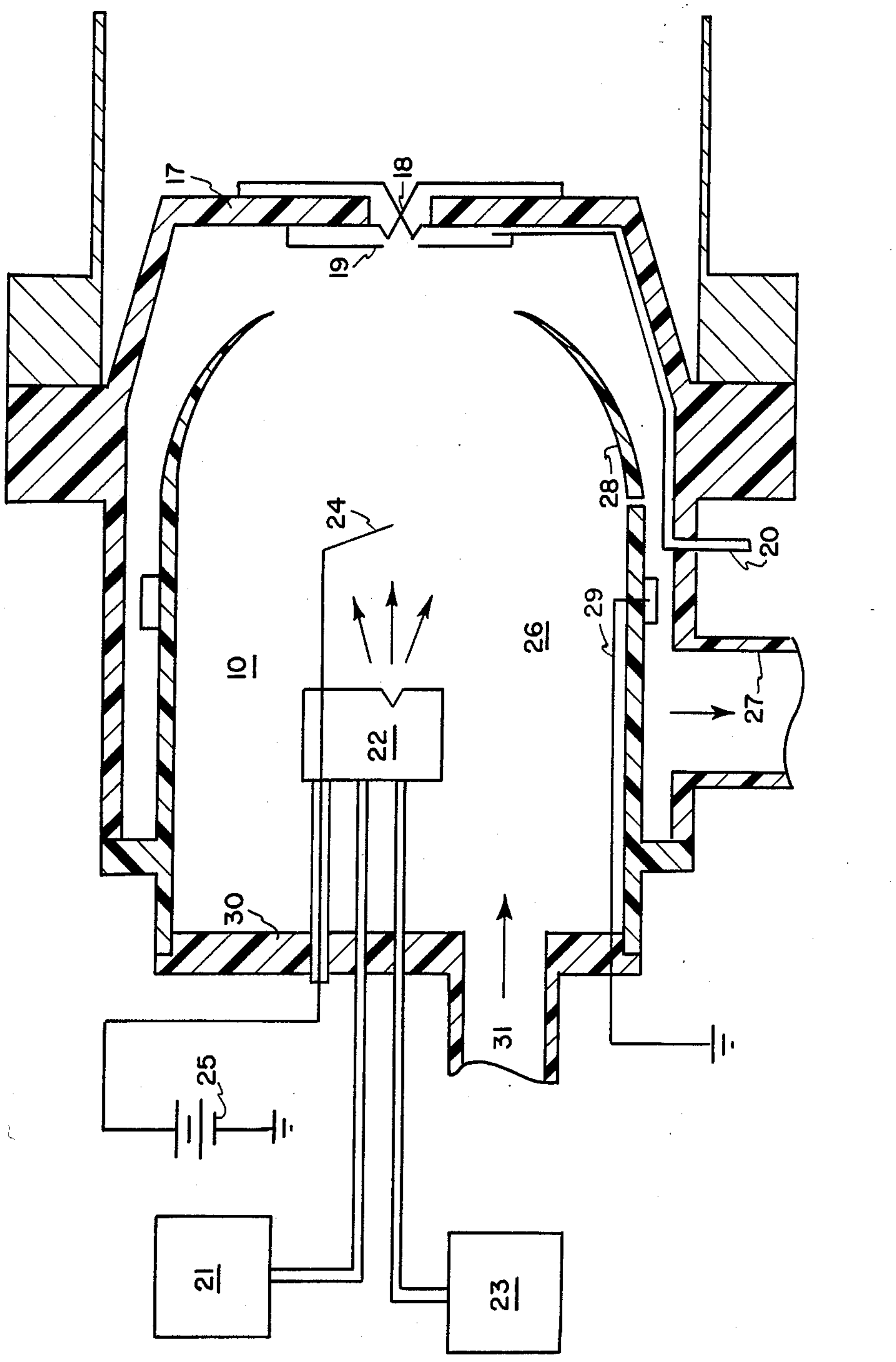
FIG. 2 is a cross-sectional side view of a preferred embodiment of the ion source volume portion of the mass analyzer.

The ion source region 10 is shown in FIG. 2 as a sectional side view. The front flange 17 is attached to the vacuum chamber 11 which houses the ion lenses, mass analyzer and ion detector assemblies. The inlet orifice 18 ($35\times10^{-6}$ meters diameter) is mounted slightly behind a ring shaped protective shield 19. Dry nitrogen, supplied through inlet tube 20 constantly purges the area around the orifice inlet so as to keep the area clean and dry. The dry nitrogen helps to prevent large ion clusters or droplets from reaching the orifice, as they could obstruct the small orifice. The gas or liquid is introduced from a chromatograph 21 to the nebulizer 22. Additional gas is supplied from a regulated gas source 23 to the nebulizer as needed. The nebulized sample is sprayed past the ionizing electrode 24. A current limited variable 0–150 kilovolt switchable direct current power supply 25 is connected to the ionizing electrode. Both the nebulizer and electrode are housed in the inner source volume 26, which is constructed of a good high dielectric, electrically insulating and chemically resistant material. A vacuum pump (not shown) connected to vacuum outlet 27, draws the ions, gases and particles from the nebulizer through an opening in the inner ion source volume so as to create a flow of the ionized sample past the sampling orifice 18. An opening in the lower portion of the inner source volume 28 provides a drain for any excess liquid from the nebulizer and source assembly. The excess liquid is also removed by the vacuum pump connected to vacuum outlet 27. A metallic band 29, connected to a suitable ground, surrounds the inner ion source volume to provide a grounding surface for the ions as they are removed by the vacuum pump. This acts to prevent a dangerous charge build up in ion volume region 10. When operating under atmospheric pressure conditions, the ion volume sealing plate 30 can be removed to expose the ion source region to ambient conditions. If it is desirable to operate at reduced pressure within the ion source volume, the sealing plate 30, with appropriate inlets for the ionizing electrode and gas and liquid supply lines for the nebulizer, can be installed to create an airtight ion source region 10 . The pressure in the ion region will be dependent upon the pumping capacity of the vacuum pump and associated regulators (not shown). In a similar manner, pressure may be increased above ambient within the ion source region by the addition of an appropriate compressed gas through inlet 31.

Figure 3:
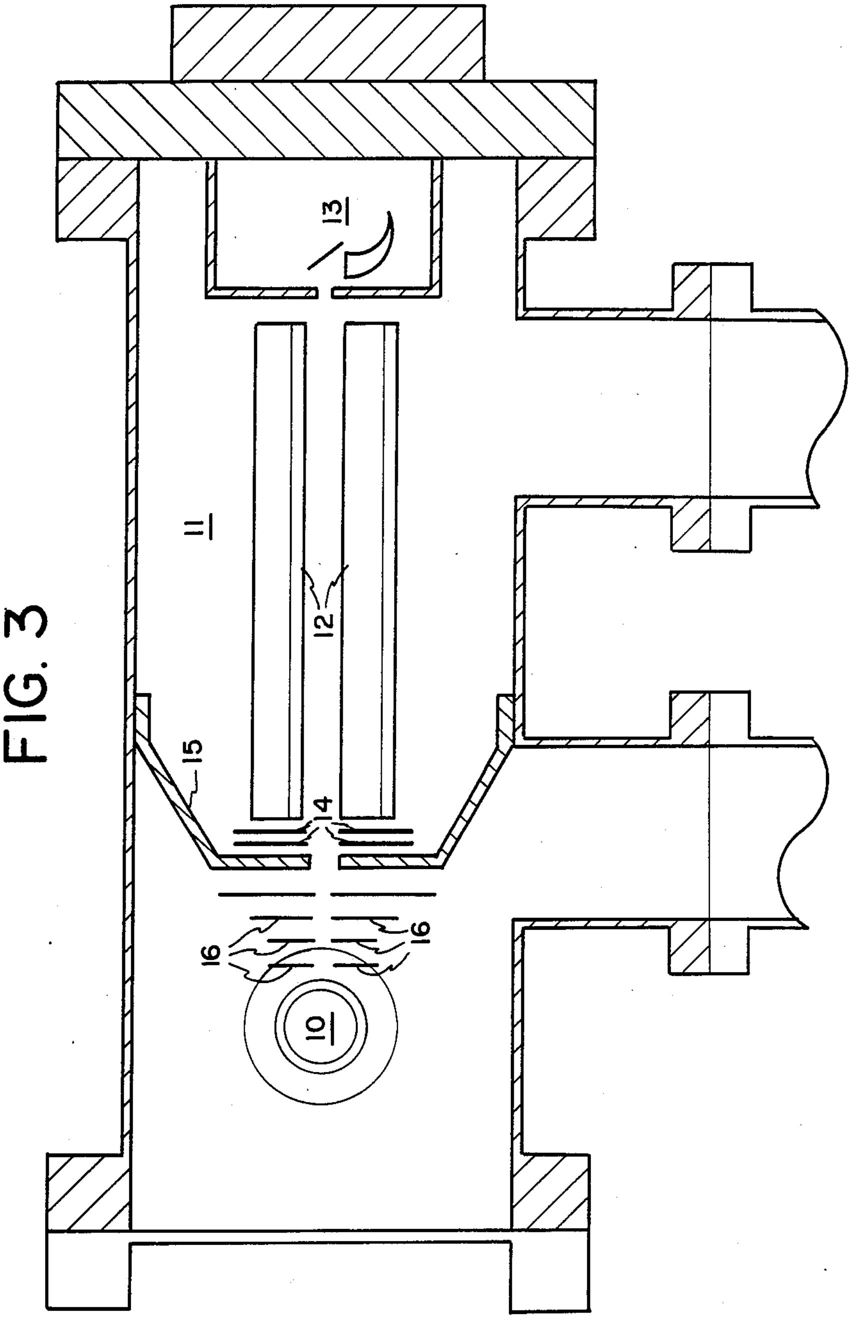
FIG. 3 is a schematic of a differentially pumped quadrupole mass analyzer suitable for interface with the described alternate ion generation source.
Figure 4:
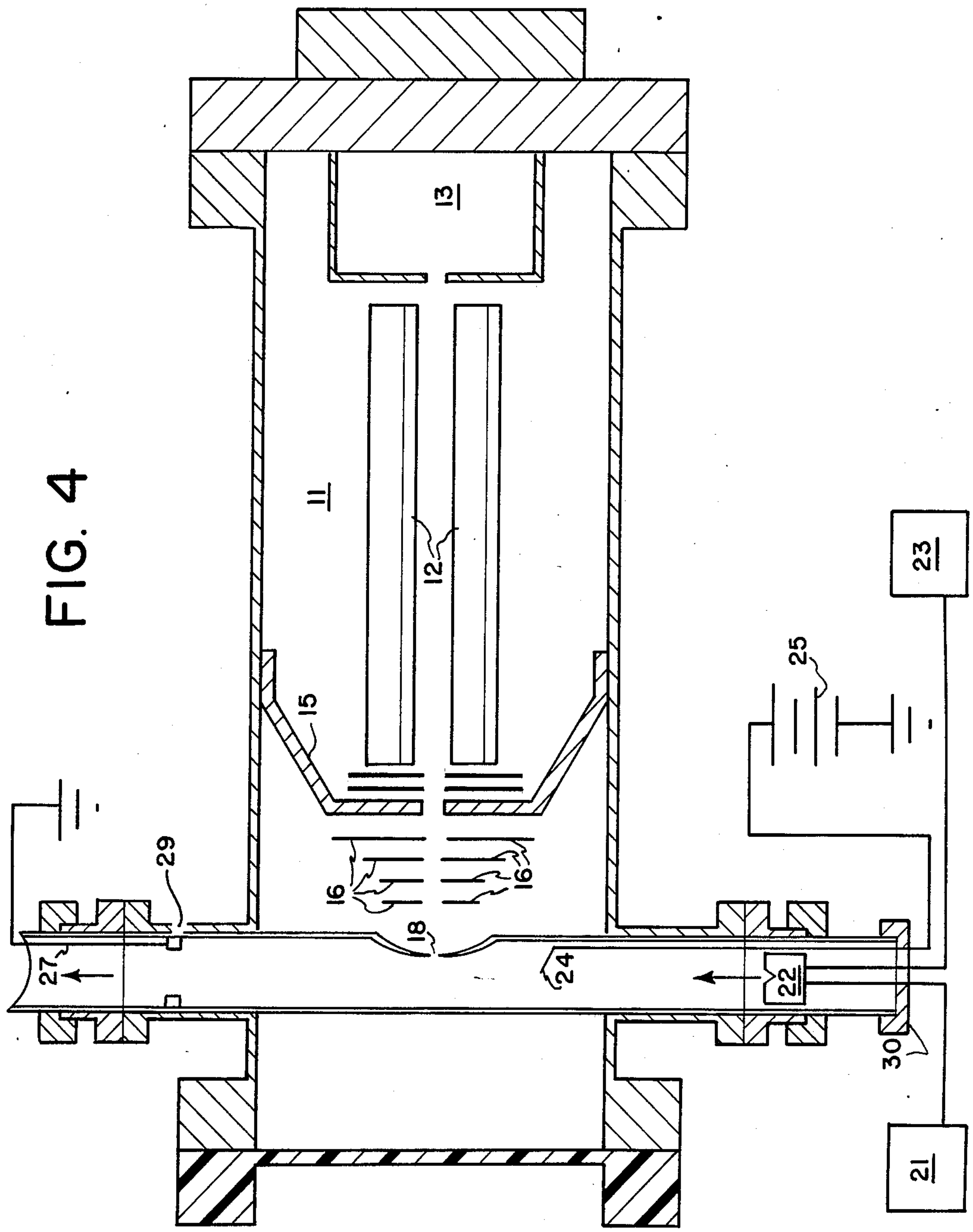
FIG. 4 is a cross-sectional top view of an alternate preferred embodiment of the ion source volume with the mass analyzer.

FIG. 3 depicts an alternate embodiment of the invention. In this embodiment, the ion source volume region 10 is an electrically insulated tube positioned 90 degrees relative to the mass filter 12. FIG. 4 depicts the cross-sectional top view. The ion inlet orifice 18 is positioned directly in front of the series of ion lenses 16. The ionization electrode 24 is positioned in front of the gas/liquid nebulizer 22 in one end of the ion volume. A metallic grounding band 27 is located within the opposite side of the ion volume. A vacuum pump (not shown) is connected to vacuum outlet 27 and removes the ions, gases, liquids and particles from the ion volume, This also creates a flow across the ion inlet orifice 18. Other components are functionally equivalent to those described in FIGS. 1 and 2.

As these are embodiments of the high voltage ion sources described, many other physical manifestations of the method could be contrived as space limitations or conditions require by those skilled in the field.

As described, the invention is suitable for interfacing a source of liquid, which may serve as either the analyte or as a solvent containing the analytes, to a quadrupole, magnetic sector or cyclotron mass analyzer. Normally, the liquid would be supplied from liquid chromatograph 21. The liquid may be an aqueous solvent, an organic solvent or a mixture thereof. Additionally, the liquid can contain dissolved compounds, ionized compounds or electrolytes such as salts or buffers, or any combination of these solutes. However, the method does not rely on the presence of such electrolytes or buffers for operation.

The invention, as described, is also suitable for interfacing a source of gas, or mixtures of gases including trace constituents to a quadrupole, magnetic sector or cyclotron mass analyzer. The gases are normally supplied from a gas chromatograph. The gas may serve as the analyte or as a carrier containing volatilized analytes.

To generate the high fields required, an electrode held at high electric potential is positioned in the path of the vapor and droplet flow. Considerable design and material latitude is available in the shape and composition of the ionizing electrode 24. The only requirement is that a field can be generated of sufficient strength to impart a charge by conduction or induction on the nebulized sample above the critical breakdown potential of the sample to effect ion emission by the described principles. A 16 gauge stainless steel needle electrode is generally suitable. A current limited DC high voltage source 25, usually of a variable voltage design, is used to generate the electric potential. The high voltage source is normally grounded to the mass analyzer, chromatographs and other associated hardware to prevent dangerous charge build-up. The polarity applied to the electrode determines the nature of the ions formed. As such, either positive or negative ions can be generated. In the preferred embodiment, a current limited, polarity switchable, variable 0 to 150 kilovolt DC power supply 25 is used. Total ion current should be high enough to ionize at least a portion of the effluent. The ion current can vary over several orders of magnitude, dependent primarily upon the nature and amount of vapor or liquid effluent. At liquid flow rates of 1.0 ml per minute, aqueous based solvents require electrode potentials between 15 and 60 kilovolts at total ion currents of 100 to 400 microamps to effect ionization. Non-polar solvents, such as heptane, require electrode potentials between 50 and 90 kilovolts at total ion currents of 50 to 300 microamps. Non-polar aprotic solvents such as perfluorodecalin require electrode potentials greater than 110 kilovolts at total ion currents of 50 to 300 microamps to effect ionization. These ranges can vary with other factors, such as the size of the ionizing electrode or the volume of the ion source. Higher voltages, which would act to generate higher field potentials, can be employed. Higher electrode ionizing potentials often result in the formation of multiple charged ions. Fragmentation also occurs at high electrode potentials. The voltage limit of the method is the voltage at which spark discharge occurs. With the ion source surface electrically insulated to prevent discharge to the mass analyzer, gas or liquid chromatograph or other associated conductive materials, charge transfer to the nebulized effluent will occur.

Under conditions of spark discharge, the required high potential field collapses. This condition is to be avoided. The materials employed in the construction of the ion source volume 26 must be selected to minimize the possibility of discharge. The ion source volume may be constructed of any material which provides sufficient electrical insulation and chemical resistance so as to prevent electrical discharge to the conducting surfaces of the associated hardware during operation. Glass, teflon, polypropylene or glass reinforced epoxy composites are suggested, although a variety of other materials are suitable. Alternately, these materials may act as liners or coatings to more conventional mass analyzer materials, such as stainless steel.

To form the droplets, the nebulizer 22 is constructed to accept the liquid effluent at conventional liquid chromatographic flow rates of 0.5 to 2.0 ml per minute. Higher or lower liquid flow rates can also be used. The ionization method is not specific to the design of the nebulizer, and Babington type, concentric, cross-flow, piezo-electric and v-groove nebulizers are several of the designs that can be used. The nature and position of the nebulizer are dictated by the liquid flow rate, total flow volume, characteristics of the solvent, flow characteristics of the source volume and other conditions as the immediate analysis requires. In some cases, it is useful to vary the temperature of the gas or liquid effluent, and heaters or evaporators can be incorporated into the nebulizer and supply lines. If the nebulizer is mounted within discharge range of the ionizing electrode 24, it should be coated or constructed of a suitable electrically insulating material to prevent discharge from the ionizing electrode. It is also recommended to construct the nebulizer gas and liquid supply lines of a chemically inert, electrically insulating material to prevent the buildup of dangerous amounts of charge in related equipment. Teflon microbore tubing is generally used for the supply lines.

A vacuum pump connected to a drain 27 in the lowest portion of the ion volume is useful to continually rid the source of the liquid effluent. This serves to eliminate solvent buildup on the walls of the ion source, which can cause electrical discharge.

The shape and position of the ion source volume 26 is limited only by the requirement that the ions formed therein can be directed into the mass analyzer. Additionally, the ion source can be integrated into the ion volume of a cyclotron. Source design should be such that nebulized sample is continuously being renewed with new nebulized effluent in the vicinity of the mass analyzer sampling inlet 18. A flow condition should be generated around the inlet by the addition of a suitable pump, such as the pump connected to outlet 27, positioned as the design of the source allows. Such a flow acts to preserve chromatographic separation when a continuously scanning mass analyzer is used. To increase the number of ions directed into the mass analyzer, a focusing electrode or system of lenses could be incorporated into the source volume.

The potential applied to the ionizing electrode is determined by maximizing the signal intensity at the mass spectrometer. The signal and optimal electrode voltages are known to vary with the relative position of the ionizing electrode, the composition and amount of sample introduced into the ion source, and the pressure associated with the source.

As described, the ionization method can function over a wide range of pressures. The ion volume may be open to the atmosphere, and function at ambient pressure. Alternately, the source volume can be sealed and connected to a vacuum pump through an adjustable pressure valve. As such, the system could be operated at a reduced pressure, dependent upon the setting of the pressure valve and the capacity of the vacuum pump. Under reduced pressure, a temperature drop associated with the nebulized effluent occurs due to free jet expansion. Cartridge heaters installed within the nebulizer are recommended to prevent freezing of the solvent on nebulization. To operate the system at pressures above ambient, compressed gas would be supplied to the sealed ion volume through a pressure regulating apparatus. The pressure could then be adjusted within the allowable limits of the construction and design of the source volume. The ion source, as described, can function over a source volume pressure range of approximately $10^{-3}$ torr to several thousand torr. This range can be extended by appropriate hardware modifications familiar to those skilled in the field.

The ions formed by this method are in a vibrationally unexcited state. Inherent thermal energy is 3/2 RT (where R is the gas constant and T is the ambient temperature in degrees Kelvin), which translates to about 0.0385 eV per molecule at room temperature and therefore thermally induced fragmentation should not accompany ionization. Additionally, the ions formed repel each other electrostatically. This helps prevent cluster formation and mechanical collisions, which further acts to reduce the probability of fragmentation.

A distinguishing feature of this ionization method is the absence of protonated parent ions in the positive ion mode. This occurs because ion formation is not dependent on ion-molecule proton transfer reactions. Protonated species can be formed, however. The addition of an appropriate proton donor to the ionized sample prior to sampling by the mass analyzer induces ion-molecule charge transfer reactions. Also, if the field potential is reduced sufficiently, ion-molecule charge transfer reactions become the primary ion formation mechanism.

Figure 5:
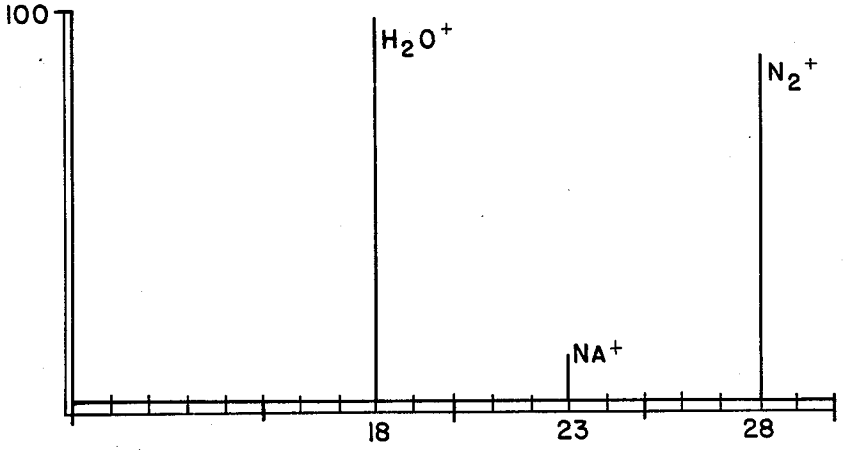
FIG. 5 is a mass scan of an aqueous solution of dilute sodium chloride.

A mass scan of a dilute aqueous solution of sodium chloride is represented in FIG. 5. Water is present as the cation at m/z 18 (where m/z represents the ratio of the atomic mass of the molecule to the charge). Nitrogen, present as the nebulization gas is assigned to m/z 28. A small peak present at m/z 23 is assigned to the sodium cation. Both water and nitrogen are observed directly as the cations, and not as protonated molecular ions. The mass scan was taken using a luquid flow rate of 1.0 ml per minute at a reduced temperature of 4 degrees centigrade, at an ion source volume pressure of 1 torr. A 40 kilovolt positive polarity electric potential was applied to the ionizing electrode at an ion current of 60 microamps. A conventional, commercially available quadrupole mass analyzer and data collection system were used.

Numerous additions and modifications can be made to the embodiment described above without departing from the spirit of the present invention. Accordingly, the scope of this patent should be construed to cover additions and modifications within the scope of the appended claims and equivalents thereof.

Having described my invention, I claim:

1. A method for the analysis of materials and constituents therein, comprising:

holding an electrode at high electric potential within a chamber with sufficient electrical insulation to prevent sparking to form a region of sufficiently high potential above the critical breakdown potential necessary to cause spontaneous ion production;

passing said material into close proximity to said electrode and through said region of high electric potential such that said material is inductively charged directly by said field to spontaneously produce ions; and utilizing said ions for mass analysis.

2. A method in accordance with claim 1, wherein the said material comprises a liquid and said electric potential is held sufficiently high to cause spontaneous Rayleigh ion emission.

3. A method in accordance with claim 1, wherein the said material comprises a gas and said electric potential is held sufficiently high to cause spontaneous ion formation.

4. A method in accordance with claim 1, wherein the said material is the liquid effluent from a liquid chromatograph, and the constituents of the liquid are compounds which have been separated by the operation of the said liquid chromatograph, and including the step of nebulizing said liquid before passing it through said region of high electric potential.

5. A method in accordance with claim 1, wherein the said material comprises a liquid in the form of polar solvents and the constituents of the liquid are electrolytes including salts, buffers and ionized compounds, and further including the step of nebulizing said liquid before passing it through said region of high electric potential.

6. A method in accordance with claim 1, wherein the said material comprises a liquid in the form of polar solvents and the constituents of the liquid are electrolytes including salts, buffers and ionized compounds, and including the step of nebulizing said liquid before passing it through said region of high electric potential.

7. A method in accordance with claim 1, wherein the said material comprises a liquid in the form of polar solvents and the constituents of the liquid are both uncharged and charged compounds, and including the step of nebulizing said liquid before passing it through said region of high electric potential.

8. A method in accordance with claim 1, wherein the said material comprises a liquid in the form of non-polar solvents and the constituents of the liquid are electrolytes including salts, buffers and ionized compounds, and further including the step of nebulizing said liquid before passing it through said region of high electric potential.

9. A method in accordance with claim 1, wherein the said material comprises a liquid in the form of non-polar solvents and the constituents of the liquid are uncharged compounds and including the step of nebulizing said liquid before passing it through said region of high electric potential.

10. A method in accordance with claim 1, wherein the said material comprises a liquid in the form of non-polar solvents and the constituents of the liquid are both charged and uncharged compounds, and including the step of nebulizing said liquid before passing it through said region of high electric potential.

11. A method in accordance with claim 1, wherein the said liquid comprises a liquid in the form of mixtures of polar and non-polar solvents and the constituents of the liquid are charged compounds, and including the step of nebulizing said liquid before passing it through said region of high electric potential.

12. A method in accordance with claim 1, wherein the said material comprises a liquid in the form of mixtures of polar and non-polar solvents and the constituents of the liquid are uncharged compounds, and including the step of nebulizing said liquid before passing it through said region of high electric potential.

13. A method in accordance with claim 1, wherein the said material comprises a liquid in the form of mixtures of polar and non-polar solvents and the constituents of the liquid are both charged and uncharged compounds, and including the step of nebulizing said liquid before passing it through said region of high electric potential.

14. A method in accordance with claim 1, wherein the said material is a gas from a gas chromatograph, and the constituents of the gas are compounds which have been separated by the operation of the said gas chromatograph.

15. A method in accordance with claim 1, wherein the said electrode is held at high positive electric potential, causing the material to become charged positively on passing by the region of the said electrode, thereby causing the ions emitted to be positively charged.

16. A method in accordance with claim 1, wherein the said electrode is held at high negative electric potential, causing the material to become charged negatively on passing by the region of the said electrode, thereby causing the ions emitted to be negatively charged.

17. A method in accordance with claim 1, wherein the said electric potential is greater than 15 kilovolts.

18. A method in accordance with claim 1, wherein the said electric potential is greater than 60 kilovolts.

19. A method in accordance with claim 1, wherein the said electric potential is greater than 120 kilovolts.

20. A method in accordance with claim 1, further including the step of admitting gas into the chamber for increasing the pressure within said chamber.

21. A method in accordance with claim 1, wherein the material in the chamber comprises a liquid and including the steps of nebulizing the said liquid before passing it through said region of high electric potential and admitting gas into the chamber the purpose of aiding droplet formation in said nebulization step.

22. A method in accordance with claim 1, wherein the interior of said chamber is maintained at ambient atmospheric pressure.

23. A method in accordance with claim 1, wherein the interior of said chamber is maintained below atmospheric pressure by the operation of a pump connected to the said chamber and acting to remove the material within the chamber.

24. A method in accordance with claim 1, wherein the interior of said chamber is maintained above atmospheric pressure by the operation of a pump connected to the chamber acting to increase the amount of gas and vapors within the chamber.

25. A method in accordance with claim 1, wherein the interior of the the chamber is heated above ambient temperature.

26. A method in accordance with claim 1, wherein the material is a liquid which is sprayed into the chamber and including the step of heating the liquid to a temperature above the freezing point of the liquid to compensate for the tempeature drop from the spraying of the liquid into a region of reduced pressure.

27. A method in accordance with claim 1, wherein the interior of the chamber is cooled to lower the temperature within the chamber below ambient temperture to prevent thermally unstable compounds from decomposing or fragmenting.

28. A method in accordance with claim 1, wherein the electric potential is raised sufficiently to produce multiply charged ions.

29. An apparatus for the analysis of materials, comprising:

- a housing forming an electrically insulated chamber with sufficient electrical insulation to prevent sparking, said chamber having a material inlet and ion outlet;
- means for holding said electrode at a high electric potential to form a region of sufficiently high electric potential above the critical breakdown potential necessary to spontaneously produce ions;
- means for passing a material from said inlet through said region of high electric potential to thereby effect spontaneous ion production from said material; and
- means for directing said ions to said ion outlet and into a mass spectrometer.

30. An apparatus in accordance with claim 29 including a liquid chromatograph connected to said fluid inlet, and wherein said fluid is a liquid effluent from said liquid chromatograph, and said passing means comprises means for spraying said liquid through said region, and the constituents of the liquid are compounds which have been separated by the operation of the said liquid chromatograph.

31. An apparatus in accordance with claim 29 including a gas chromatograph connected to said fluid inlet, and wherein said fluid is a gas effluent from said gas chromatograph, and the constituents of the gas are compounds which have been separated by the operation of the said gas chromatograph.

32. An apparatus in accordance with claim 29 wherein said holding means holds said electrode at high positive electric potential.

33. An apparatus in accordance with claim 29 wherein said holding means holds said electrode at high negative electric potential.

34. An apparatus in accordance with claim 29 including means for maintaining said chamber at ambient atmospheric pressure.

35. An apparatus in accordance with claim 29 including means for maintaining said chamber below atmospheric pressure.

36. An apparatus in accordance with claim 29 including means for maintaining said chamber above atmospheric pressure.

37. An apparatus in accordance with claim 29 including a pump connected to the said chamber for removeing excess fluid from the chamber.

38. An apparatus in accordance with claim 29 wherein the said chamber is constructed of electrically insulating materials sufficient to prevent electrical discharge from said electrode at potentials to 150 kilovolts.

39. An apparatus in accordance with claim 29 wherein the said chamber is coated or lined with electrically insulating materials sufficient to prevent electrical discharge from said electrode at potentials to 150 kilovolts.

40. An apparatus in accordance with claim 29 wherein said material is a liquid and said passing means includes an apparatus for producing droplets from said liquid, said apparatus being constructed of electrically insulating materials.

41. An apparatus in accordance with claim 29 wherein said material is a liquid and said passing means includes an apparatus for producing droplets from said liquid, said apparatus being coated with electrically insulating materials.

42. An apparatus in accordance with claim 29 wherein said holding means comprises a variable voltage, polarity switchable, current limited, overvoltage protected 0 to 120 kilovolt direct current power supply.

* * * * *